June 17, 1941.  W. JAMES  2,245,784
GRAPHIC SPEED RECORDER FOR VEHICLES
Filed Aug. 24, 1937  3 Sheets-Sheet 2
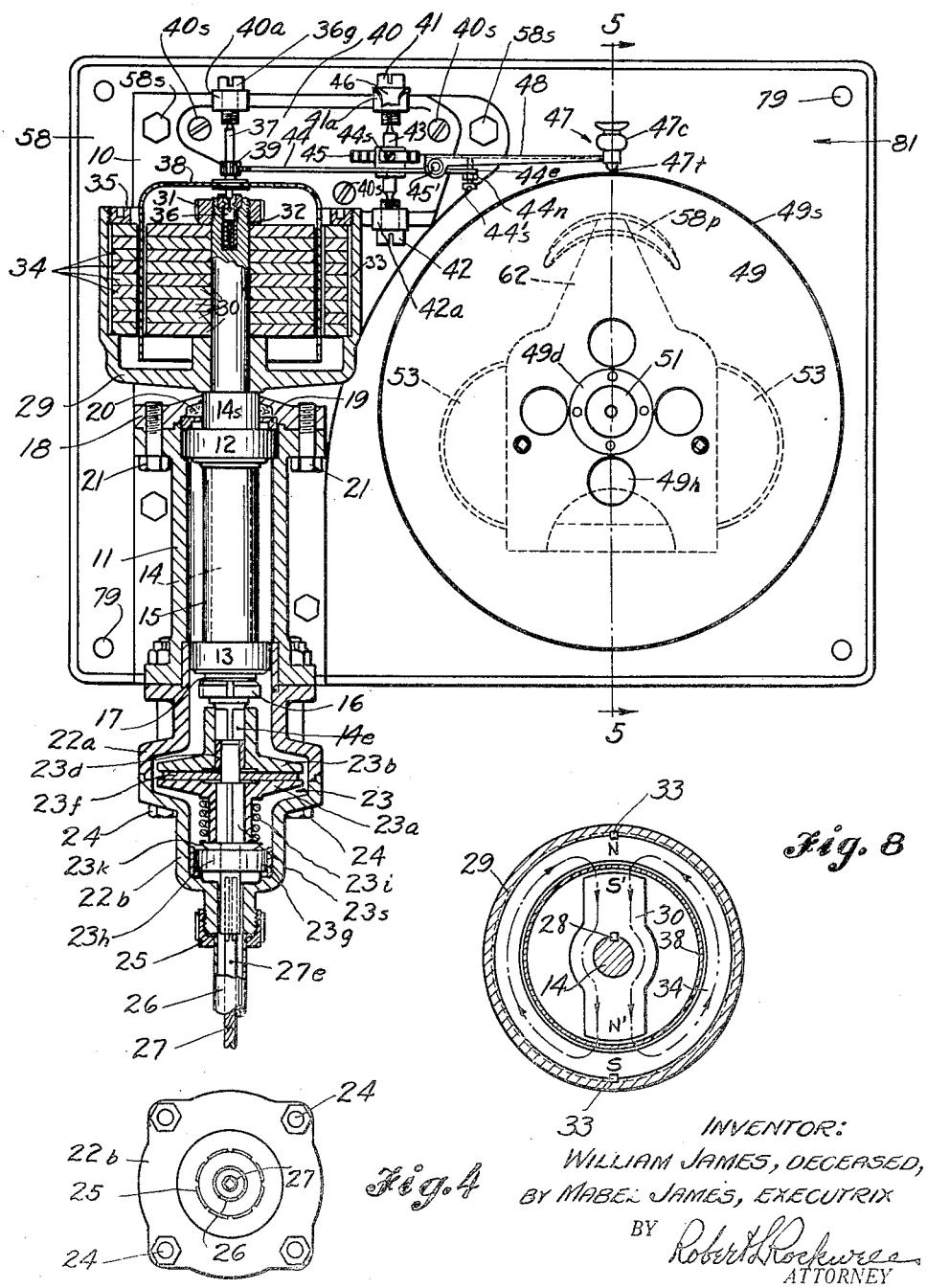
INVENTOR:
WILLIAM JAMES, DECEASED,
BY MABEL JAMES, EXECUTRIX
BY Robert L. Rockwell
ATTORNEY June 17, 1941.  W. JAMES  2,245,784
GRAPHIC SPEED RECORDER FOR VEHICLES
Filed Aug. 24, 1937   3 Sheets-Sheet 3
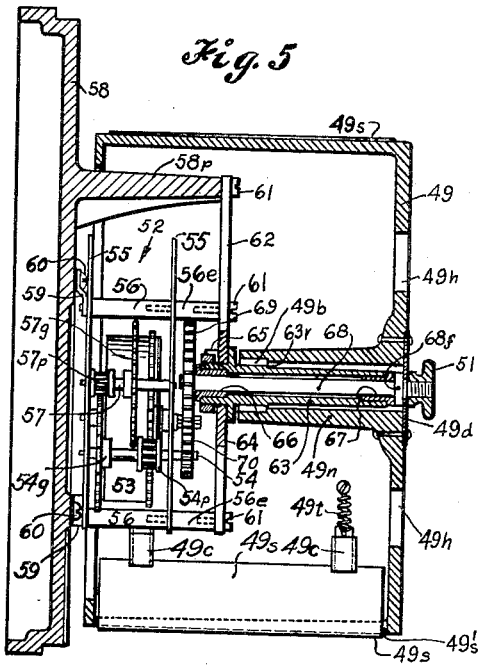
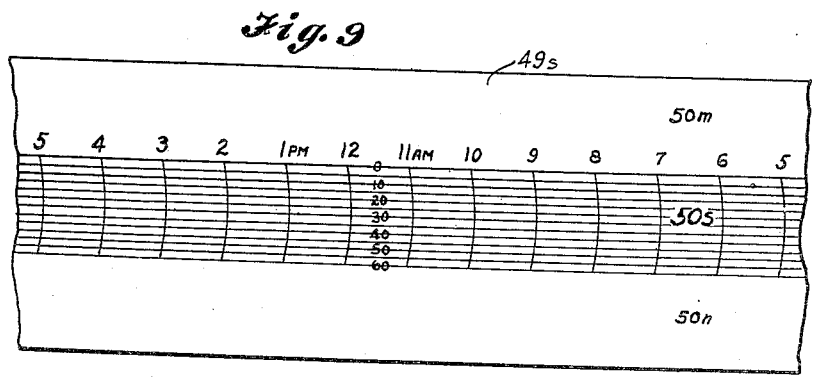
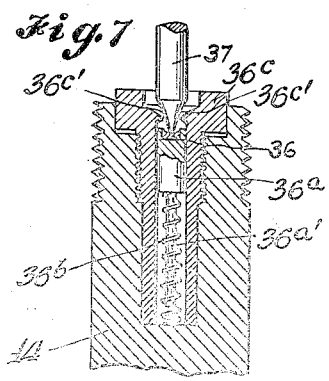
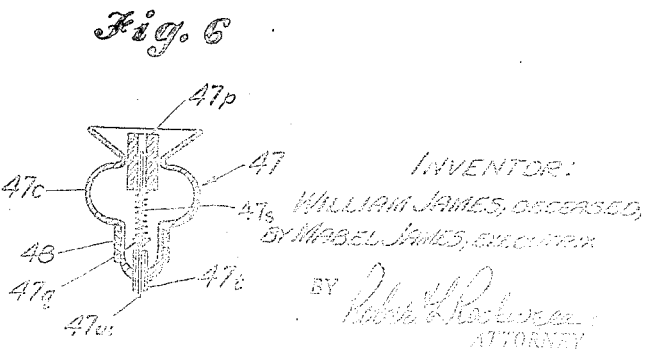

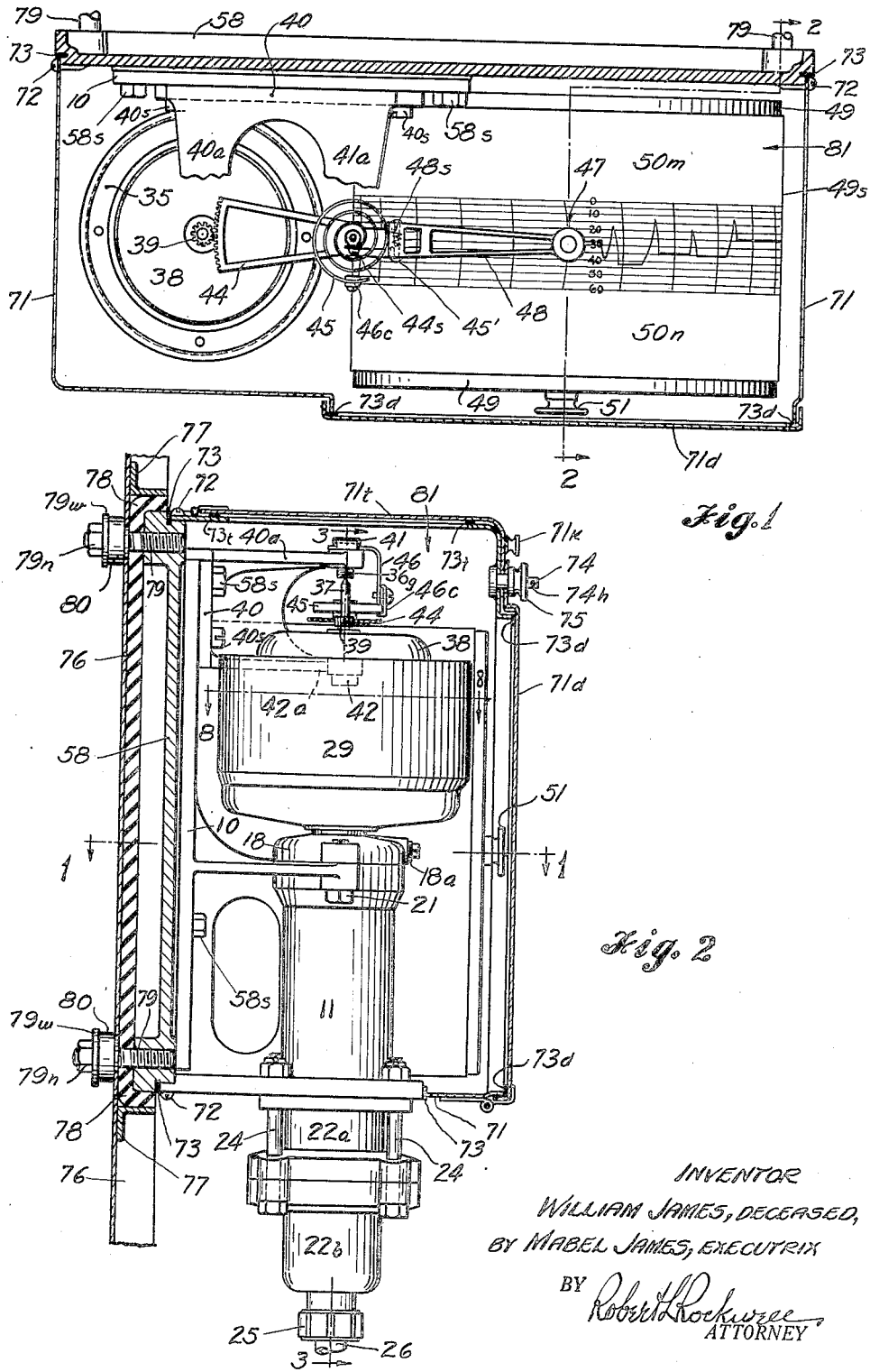

Patented June 17, 1941

2,245,784

UNITED STATES PATENT OFFICE 2,245,784

GRAPHIC SPEED RECORDER FOR VEHICLES

William James, deceased, late of Seattle, Wash., by Mabel James, executrix, Deer Harbor, Wash., assignor to Florence L. Cromwell, Monroe, Wash.

Application August 24, 1937, Serial No. 160,638

4 Claims. (Cl. 264—13)

This invention relates to speed recording devices in general, and to those types of such devices in particular that are adapted to be mounted upon and to record the speed of automotive vehicles.

The device of the invention operates by means of the rotation of a permanent magnet system adapted to coact electromagnetically with a pivotally mounted and spring controlled induction element, that is turned thereby from its normal zero position until the force exerted by the control spring just balances the force produced by the eddy currents induced in said element and the magnetic flux of the rotating magnet system.

The invention is characterized particularly by the improved arrangement of the coacting parts of the magnet and recording systems which greatly increase the torque available for moving the element used for drawing the speed curve upon a properly calibrated moving chart.

The said magnet system comprises both an interior and an exterior permanent magnet disposed on a common spindle in the same horizontal plane, but separated by short air gaps in which the pivotally supported and spring controlled induction element may move without touching either of said magnets.

This arrangement of the magnet system provides a concentrated and powerful magnetic field in said air gaps, the magnetic flux of which passes through the skirt portion of the induction element, thus greatly increasing the torque therein resulting from the rotation of the magnet system, as will be more fully explained.

The torque thus produced may be multiplied several times by means of a pivotally mounted lever element that carries a coiled control spring coaxial with the pivot shaft, and that provides at one extremity a gear sector for engagement with a pinion secured to the pivot shaft of the induction element, and at the other extremity any suitable means for drawing the speed curve upon the calibrated moving chart.

Said chart preferably is removably secured to the periphery of a drum revolved at the proper speed by means of a clock mechanism through the intermediacy of a train of gears.

An object of the invention is to provide a closed magnetic circuit speed recorder that produces a concentrated powerful and protected magnetic field for the operation of the induction element.

Another object is to provide a device of the kind described in which the strength of the magnetic field may be varied over a wide range by assembling a larger or smaller number of the standardized permanent magnet laminations.

An additional object is to provide friction clutch means in a device of the kind described for preventing the damaging of the driving cable by sudden changes in the speed values to be recorded.

A further object is to provide mechanical means in a device of the kind described for increasing the torque available for the operation of the curve drawing element.

A still further object is to provide improved means in a device of the kind described for motivating a readily removable chart drum.

Other objects and advantages will be apparent to those skilled in the art from the following detailed description of a preferred form of the invention, which consists of certain parts and combination of parts, hereinafter described, illustrated in the accompanying drawings and embraced in the appended claims.

In the drawings:

Figure 1 is a top view of the speed recorder mechanism with the housing in section as taken on broken line 1—1 of Fig. 2, and with the top bearing brackets broken away.

Fig. 2 is a left side elevation of the mechanism of the device with the support frame, base and housing in section, taken on broken line 2—2 of Fig. 1.

Fig. 3 is a front elevation of the mechanism, with a section through the rotating elements taken on broken line 3—3 of Fig. 2, and with the inclosing housing removed.

Fig. 4 is a bottom view of the friction clutch housing.

Fig. 5 is a section through the chart drum and base on broken line 5—5 of Fig. 3, showing a side elevation of the mechanism for motivating the drum.

Fig. 6 is a medial sectional elevation of the inking device to a larger scale.

Fig. 7 is a medial sectional elevation of the upper end of the magnet system spindle to a larger scale with the clamp nut removed, showing the construction of the lower pivot bearing for the induction element.

Fig. 8 is a sectional plan view of the magnet system taken on broken line 8—8 of Fig. 2.

Fig. 9 is a plan of a portion of the chart on which the speed is recorded by the instrument.

Like reference numerals are used to indicate like parts throughout the drawings, wherein 10 refers to the frame for the speed recorder mechanism unit preferably made of non-magnetic material, such as aluminum, removably secured to base 58 by cap screws 58s and providing a bearing housing 11 bored to receive ball bearings 12 and 13. Said ball bearings have their inner races fixedly secured on a vertically disposed spindle 14 by means of shoulder 14s, spacer tubing 15, and nut 16, which is secured by lock washer 17.

The upper end of said bearing housing is closed by head 18, with which are associated clamp ring 19 and felt seal ring 20, said head being held in position by means of cap screws 21.

Two separable parts 22a and 22b of a housing for friction clutch 23 are secured to the lower end of bearing housing 11 by means of bolts 24.

The lower end of housing part 22b is threaded to receive terminal connecting ferrule 25 of sheath 26 for flexible drive shaft 27. Said shaft is provided with a terminal element 27e having a square end adapted to slidably engage a square hole in the end of spindle 23s of said clutch. Said clutch in turn provides a driving connection with the square end 14e of spindle 14, as hereinafter more fully described. The other end of said shaft is connected to the mechanism whose speed is to be recorded.

Lubrication in the form of a suitable grease, such as vaseline, is inserted into the space above bearing 12 through a plugged opening 18a in head 18. The excess grease drops down onto and lubricates bearing 13, and from there the excess drops into sheath 26 to lubricate the flexible drive shaft.

The upper end portion of the spindle is provided with a keyway in which a feather key 28 is placed. This provides a positive driving engagement with the hub of an upwardly turned cup element 29 and a plurality of hardened steel permanent bar magnet laminations 30; nut 31, secured by lock washer 32, being used to hold said parts firmly together. As shown in Fig. 8, two keys 33 may be provided in cup 29 to engage and fixedly position a plurality of ring magnet laminations 34, also of hardened steel, which are held in position by means of ring nut 35, preferably of brass.

Each bar magnet lamination 30, having opposite magnetic poles at its ends, together with the correspondingly positioned ring magnet lamination 34 in the stack, having diametrically disposed consequent magnetic poles opposite in polarity to the adjacent poles of said bar magnet, combine to form a standardized pair of permanent magnet laminations, in which the magnetic flux circuit is closed through the lamination elements themselves separated at their magnetic poles only by short air gaps. Each said air gap provides a concentrated powerful and protected magnetic field for the operation of induction element 38, hereinafter more fully described.

By a ring magnet having consequent magnetic poles is meant a smooth annulus of retentive magnetic material devoid of physically defined magnetic polar projections, but so magnetized that the lines of magnetic force in the annulus on one side of a medial neutral magnetic axis flow clockwise and on the other side counterclockwise, thereby producing diametrically opposite magnetic polar regions where said lines of magnetic force from both said sides of the annulus combine to form a resultant north magnetic pole, and where the magnetic lines from the exterior magnetic circuit reenter the annulus at a resultant south magnetic pole and there divide to flow through the respective said sides thereof.

The combination of an interior bar magnet having its magnetic north and south poles opposite to and separated by air gaps from the magnetic south and north consequent poles, respectively, of a said ring magnet is particularly adapted to utilize not only all of the direct polar flux that passes through the air gaps opposite the poles of the bar magnet, but also to utilize the flux that fringes laterally therefrom together with the sizeable leakage flux in the interior portions between the polar regions of the two sides of the ring magnet that are either side of the aforesaid neutral axis. Furthermore the amount of leakage flux for the combination as a whole is greatly reduced, thereby making it possible to secure sufficient usable magnetic flux for the operation of a graphic recording arm by means of induction element 38, as hereinafter described, with much less weight and cost for the rotating magnet system.

Such a combination of permanent magnets is magnetically balanced on either side of the aforesaid neutral axis. It also is balanced for rotation about a medial axis of rotation normal to said neutral axis, because there is no unbalancing air gap in the ring magnet.

The thin laminations of hardened magnet steel are easily magnetized and retain their magnetism for a long period of time, especially while in the aforesaid closed magnetic circuit relation, which is similar in its effect to the well known "keeper" universally used for the familiar horseshoe type of permanent magnet.

It will be apparent that the total strength of the magnetic field provided by these standardized permanent magnet lamination pairs is proportional to the number of said lamination pairs in the stack, and that the strength of the magnetic field may be varied over a wide range for different applications of the device, by varying the number of said lamination pairs assembled in constructing a given instrument.

The top end of spindle 14 is provided with a spring mounted jewel bearing 36, adapted to receive the lower end of pivot shaft 37, on which are fixedly secured inverted cup-like induction element 38, of non-magnetic but highly electrically conductive metal, such as aluminum, and a small brass pinion 39.

Jewel bearing 36 itself preferably supports the convex pivot point of shaft 37 on a broad concave upper surface, as shown clearly in Fig. 7. Said jewel bearing is fixedly secured in a cavity provided therefor in the upper end of bearing support body 36a, which may be provided with a portion of reduced diameter 36a' adapted to fit within helical spring 36b. Said spring rests upon the bottom of an interiorly threaded socket in said upper end of spindle 14, and is adapted to resiliently support the induction element assembly through the intermediacy of bearing 36 and its support body 36a, thus cushioning the shocks imparted by said induction element assembly to the jewel, that result from chuck holes and rough places in the road over which the vehicle equipped with the speed recorder may pass.

An exteriorly threaded guide sleeve 36c preferably is screwed into said interiorly threaded socket to form a renewable side guide for bearing support body 36a. Interior flange 36c' of said sleeve normally does not contact the side of the tapered lower portion of shaft 37, as illustrated in Fig. 7. However, said flange serves as an emergency side guide and downward motion stop for the lower end of the shaft whenever the intensity of the aforesaid shocks either deflect shaft 37 laterally or force it to compress spring 36b an excessive amount, thereby relieving the highly polished surface of the jewel pivot bearing of the otherwise damaging effects of abnormal lateral and vertical displacement of the pivot end of the induction element shaft, and preventing the upper journal end of shaft 37 from slipping out of the jewel guide bearing that is fixedly secured in the end of screw 36g. Said screw is adjustably secured in an arm 40a that projects outwardly over the shaft from pivot bearing frame 40. Said pivot bearing frame is secured to frame 10 by means of cap screws 40s, and frame 10 in turn is secured to base 58 by means of cap screws 58s.

Other arms 41a and 42a of the pivot bearing frame carry jewel-bearing screws 41 and 42 in which a second pivot shaft 43 is rotatively mounted. A gear sector element 44 is fixedly secured to shaft 43 by means of screw 44s, which serves also to secure one end of spiral control spring 45 to the hub of the sector, as shown best in Fig. 1. The other end of said spring is fixedly secured by a clamp 46c at the end of adjustment arm 46, which may be clamped in fixed position by means of the head of screw 41. This spring forces the gear sector into its position for recording on the 0-line of the chart when the magnet system is not rotating.

A line-drawing inking device or pen 47, is carried at the end of a light aluminum arm 48, hinge connected to gear sector element 44 by means of pin 45'. Spring 48s is used to resiliently hold said arm 48 against an adjustable stop screw 44's, which is locked in position in an extension 44e of element 44 by means of lock nut 44n. The adjustment is such that the end of small pen tube 47t of the inking device just clears the surface of a suitably calibrated chart 49s stretched tightly around a clock-mechanism-driven drum 49.

Contact with the chart is maintained by means of a freely fitting wire 47w on which a stopper 47q for the end of said pen tube is fixedly secured. Above said stopper is a spring 47s which abuts a plug 47p adapted to fit freely over the upper end of said wire but closely in the neck of the ink container 47c. In this way a thin film of ink is fed onto the moving chart, the only resistance to the lateral movement of the pen arm being the very light wire 47w and its appended parts.

Referring now to Fig. 8, it will be apparent that the downwardly extending annular portion of the aluminum cup induction element 38 lies in the path of the magnetic flux of the two polar regions of the magnet system, indicated by N—S' and N'—S, respectively, where said flux passes across the intervening air gaps in which the cup is placed.

When the magnet system is driven at a given speed in a counterclockwise direction by means of the flexible shaft, the magnetic field will move with the magnets in the same direction in relation to the aforesaid spring controlled aluminum induction element.

It is well known to those skilled in electrical science, that the said relative movement of the magnetic flux passing through said induction element will induce eddy currents therein in proportion to the speed of rotation of the magnetic field. Said eddy currents, according to Lenz law, always will be in such directions that they will react with the magnetic field producing them to exert turning forces in the induction element in the same direction as the rotation of the magnetic field.

Said turning forces times the means radius of the annular portion of the cup equal the turning torque produced, which in turn varies directly with the speed of a constant strength magnetic field. At the pitch line of small pinion 39 the force available to turn gear sector 44 in a clockwise direction is equal to the forces produced by the eddy currents multiplied by the mean radius of the induction element divided by the radius of the pitch line of the pinion, and may be varied to suit the requirement of the device. For the speed recorder mechanism illustrated, the force at the pitch line of pinion 39 is approximately 11 times the sum of the eddy current forces in the annular portion of cup 38.

This is the force that is available for moving gear sector 44, which in turn moves the inking device or pen 47 across the moving chart to draw the speed curve. As the radius from the axis of shaft 43 to the pitch line of said gear sector is made ⅔ of the distance from said axis to the center of pen tube 47t, it will be seen that the force available to move the inking device is ⅔×11=7⅓ times the sum of the eddy current forces in cup 38, neglecting friction, which with jewel bearings is very small. By this it will be seen that the torque available for the operation of the curve drawing element is greatly increased.

Only a small fraction of this torque is required to move the inking device across the moving chart, the balance being used to wind up spiral spring 45 until the force produced by the spring balances the eddy current forces exerted through the intermediacy of the cup, pinion and gear sector.

When the speed of the magnet system is reduced, the spiral spring in turn exerts its force to move the cup and said inking device back toward their respective zero speed positions, until the eddy current forces at the lower speed just balance the force produced by the spring through the intermediacy of the mechanism described.

A higher speed of the magnet system produces proportionately larger eddy current forces in the aluminum cup, which moves still further in a counter-clockwise direction until the increased force produced by the spiral spring again balances the eddy current forces exerted through the intervening mechanism parts.

From the foregoing description it will be seen that the distance the pen moves across the chart is proportional to the speed of rotation of the magnet system, because, according to Hook's law, the balancing force produced by the spring is proportional to said movement of the pen, and the eddy current forces exerted through the cup, pinion and sector to wind up the spring to produce said balancing force, are proportional to the speed of rotation of the magnet system.

By properly proportioning the several elements of the device, the desired maximum movement of the pen for a maximum speed is obtained, and the chart then may be calibrated so the horizontal lines will indicate the various intermediate speeds between zero and the maximum in any units desired, for example, miles per hour of an automotive vehicle. As the clock-mechanism-driven drum carrying the chart revolves at a speed proportional to time, the curved cross lines of the chart are calibrated in hours of the day, hence the line drawn by the pen on the chart may be a record of the speed of the vehicle at any time during the day, as illustrated in Fig. 1 of the drawings.

It usually is desirable to change the chart daily. To facilitate this operation, provision is made to remove drum 49 from its supporting and driving elements by unscrewing thumb nut 51. Fig. 5 illustrates a preferred arrangement of the clock mechanism, spindle for the drum, and other parts suitable for this purpose.

The clock mechanism 52 may be of the powerful double-main-spring type, several of the well known detail parts of which are omitted in Fig. 5 for the sake of clearness.

The driving power for the clock mechanism is derived from two main-spring elements 53 on either side of the frame, as shown in dotted lines in Fig. 3. Both spring elements are provided with peripheral gear teeth that mesh with the teeth of pinion 54p fixedly secured to shaft 54. Said shaft and the other rotating parts of the mechanism are rotatively mounted in bearing plates 55, fixedly secured to the ends of spacer posts 56 in the usual manner. Shaft 54 ordinarily carries the hour hand of the clock and makes one revolution in 12 hours. Its rate of rotation is determined by the operation of the well known escapement and other elements, not shown, through the intermediacy of gear 54g, pinion 57p, shaft 57 and gear 57g in the usual manner. The clock frame is removably secured to base 58 of the device by means of lugs 59 and screws 60.

Screws 61 secure a plate 62 to post 58p, projecting from base 58, and to threaded extension posts 56e of the clock frame. A hollow spindle 63 is secured at its flanged and threaded end to plate 62 by means of nut 64 and lock washer 65. Bearings 66 and 67 at the ends of said spindle are adapted to rotatively support shaft 68 positioned longitudinally in the spindle by means of flange 68f at its outer end, and gear 69 fixedly secured to its inner end. Gear 69 meshes with a pinion 70 fixedly secured to the projecting end of shaft 54, and has twice the number of teeth in said pinion, hence shaft 68 revolves at half the speed of shaft 54, or once in 24 hours.

Drum 49, preferably made of an aluminum alloy, is provided with an inwardly projecting hub 49n, which is fitted at its inner end with bearing sleeve 49b, adapted to rotate upon a larger portion 63r of spindle 63. A brass disc 49d may be fitted into a recess and riveted to the drum to provide a driving connection with shaft 68 when clamped between flange 68f and nut 51. When assembled as shown, it will be seen that the drum is supported on spindle 63 through bearing 49b and by the outer end of shaft 68, which in turn is rotatively supported by said hollow spindle through bearings 66 and 67. After nut 51 is removed, the thumb and first three fingers of one's hand may be inserted in holes 49h to secure a good grasp of the drum when removing or replacing it by sliding it axially of spindle 63.

Any suitable means may be used to secure the chart to the drum, such as a slot 49's in the rim through which the ends of the chart may be passed after encircling the periphery of the drum, and then drawn tight by clips 49c secured to the drum through the intermediacy of springs 49t, as illustrated in Fig. 5.

The interior parts of the device are inclosed by a housing 71 fixedly secured to base 58 by means of screws 72, a felt gasket strip 73 being used to make a dust tight joint. The heads of screws 72 may be soldered to the housing to prevent unauthorized tampering. The housing is provided with circular door 71d hinged at the bottom to provide access to the chart drum, and with a top door 71t provided with a knob 71k to afford access to the inking device. Both doors are provided with lugs which fit over the projecting end of screw 74, the head of which may be brazed to the inside of the housing. When the doors are closed a single thumb nut 75 forces both doors tightly closed against felt gaskets 73d and 73t.

Hole 74h in screw 74 is provided for the wire portion of the usual lead seal (not shown), used to prevent access by other than authorized persons.

The device may be mounted on the vehicle in any accessible location, preferably on a pair of vertically disposed angle irons 76 fixedly secured to the body of the vehicle, not shown. Cross member angles 77 may be fixedly secured to the vertical angles by welding, the arrangement being such that the out-turned legs of the vertical and horizontal angles combine to form a recess.

Strips of resilient material 78, such as sponge rubber, may be used to line the sides and a portion of the back of said recess to serve as a cushion for the recorder frame, which may be provided with stud bolts 79 that pass through considerably larger holes in angle irons 76. Said holes may be bushed by the smaller diameter end portion of sponge-rubber washers 80 for said studs, which, together with metal washers 79w and nuts 79n, serve to hold the instrument against the sponge rubber cushion strips, thus providing a firm, yet resilient, mounting for the instrument, that is particularly desirable for heavy duty vehicles such as trucks, stages and buses.

It will be apparent that the rotating mass comprising spindle 14, cup 29, magnets 30 and 34, and other appended parts, requires considerable force for its acceleration, and likewise exerts considerable force in the opposite direction when being decelerated. Such forces tend to break the flexible drive shaft, which is twisted in one direction when the device is accelerated and in the opposite direction when it is decelerated. The magnitude of the twisting force in each case is proportional to said mass and to the rate of change in its velocity; hence the twisting force in the flexible drive shaft is proportional to said mass and to its acceleration or deceleration, as the case may be.

Because of the high values of acceleration and deceleration experienced in modern vehicles, it is desirable to provide the previously mentioned simplified friction clutch 23 between the end terminal of flexible drive shaft 27 and the lower end of spindle 14, thus automatically limiting these twisting forces to values well within the elastic limit of the drive shaft.

Referring to Fig. 3, it will be seen that both drive disc 23a and driven disc 23b of clutch 23 have square holes through their axial centers, thus adapting said driven disc to fit firmly on the square end of spindle 14 and said drive disc to fit slidably on the medial square portion of clutch shaft 23s. The two disc elements may be kept in axial alignment by means of the upper round end portion of shaft 23s in rotative engagement with sleeve bearing 23d which is fixedly secured in the driven disc. The two disc elements are separated by friction disc 23f, preferably of asbestos, having a center aperture adapted to fit over the upper end portion of the clutch shaft.

An inwardly flanged ring 23g may be pressed into position in housing part 22b to removably receive the outer race of ball bearing 23h, the inner race of which is pressed onto the lower round end portion of shaft 23s, together with bevel edged disc 23k. Helical compression spring 23i bears against disc 23k at its lower end and forces slidable clutch element 23a upwardly so friction disc 23f can transmit the turning force therefrom to driven clutch element 23b and spindle 14. The upward thrust of said spring is transmitted to the outer race of bearing 12 through the intermediacy of spindle 14 and the previously described parts associated with its bearings, and from said outer race to housing 11 through clamp ring 19, head 18 and cap screws 21.

By varying the free length of spring 23i it is possible to pre-determine the maximum torque in the flexible drive shaft that will be transmitted by the friction clutch without slipping. Whenever the torque in the flexible drive shaft becomes excessive, as when the speed is changed rapidly, the clutch will slip until the torque in said shaft decreases below the pre-determined maximum, whereupon the clutch will engage and transmit the torque without slipping.

Referring particularly to Figs. 1 and 3, it will be seen that a space 81 is provided in the upper right corner within housing 71, and that ample margins 50m and 50n are left on either side of speed scale 50s of chart 49s. Said space and margins are provided so other recording mechanisms (not shown) may be added within the housing to record other important events in the operation of the vehicle associated with its speed, such as brakes "on" or "off," ignition "on" or "off," lights "on" or "off," and turns to "right" or "left," thus providing a graphic record of the vehicle's operations during its tour of duty, that would be invaluable in fixing the blame for accidents, and in indicating carelessness on the part of the driver.

From the foregoing description it will be apparent, that after the vehicle has been returned to the garage, the chart is made available by the following simple operations by an authorized person:

1. Break seal in hole of screw 74
2. Remove thumb nut 75
3. Open doors 71d and 71t, and remove thumb nut 51
4. Raise hinged pen arm 48 with one hand, grasp drum by means of holes 49h with the other hand and remove from spindle 63.
5. Release clips 49c from the ends of the chart and remove same from the drum.

It will be noted that stopper 47q prevents the ink from escaping when the pen arm is raised.

A new chart sheet may then be secured to the periphery of the drum which is replaced on spindle 63 while the pen arm is raised with the other hand and the drum turned until the pen tube is over the proper hour position on the chart, then thumb nut 51 is replaced and set up tight.

The supply of ink next may be replenished by means of a medicine dropper filled with ink. This is done by using the end of the dropper to depress stopper 47p until the required amount of ink is discharged from the dropper into ink container 47c. Doors 71t and 71d then may be closed, thumb nut 75 replaced, and a new seal placed in the hole of screw 74.

Although the preferred embodiment of the invention herein illustrated and described is devised for use in connection with automotive vehicles, it will be apparent to those skilled in the art that the combination of coacting elements constituting the invention may be adapted and applied to various other vehicles, and that various changes may be made in the details of construction and arrangement of parts without departing from the purpose and intent of the invention within the scope of the appended claims.

What is claimed as new and desired to be protected by Letters Patent is:

1. In a graphic speed recorder for vehicles, the combination of an interior bar permanent magnet comprising a magnetic north pole at one end and a magnetic south pole at the other end, an exterior solid ring permanent magnet comprising a smooth interior surface and a pair of diametrically opposite and interiorly effective consequent magnetic north and south poles that are positioned opposite to and separated by air gaps from the magnetic south and north poles respectively of said bar magnet, means for fixedly securing said bar and ring magnets in the aforesaid position and for rotating them about a common medial axis, and an annular induction element movably supported in said air gaps and adapted to be motivated by the magnetic flux of said magnets when the same are rotated.

2. In a graphic speed recorder for vehicles, the combination of a rotatively mounted spindle, an interior bar permanent magnet comprising a magnetic north pole at one end and a magnetic south pole at the other end, an exterior solid ring permanent magnet comprising a smooth interior surface and a pair of diametrically opposite and interiorly effective consequent magnetic north and south poles that are positioned opposite to and separated by air gaps from the magnetic south and north poles respectively of said bar magnet, means for fixedly securing said so positioned bar and ring magnets to said spindle, and a movably supported annular induction element so disposed in said air gaps as to be motivated by the magnetic flux of said magnets when said spindle is rotated.

3. In a graphic speed recorder for a vehicle, the combination of an upright rotatively mounted spindle having an axial recess in the upper end thereof, an interior bar permanent magnet comprising a magnetic north pole at one end and a magnetic south pole at the other end, an exterior ring permanent magnet comprising a smooth interior surface and a pair of diametrically opposite and interiorly effective consequent magnetic north and south poles that are positioned opposite to and separated by air gaps from the magnetic south and north poles respectively of said bar magnet, means for fixedly securing said so positioned bar and ring magnets to said spindle, an annular induction element rotatively supported in said air gaps by a vertically disposed shaft comprising a lower pivot point, a resiliently supported pivot bearing in the axial recess of said spindle, and normally disengaged emergency means associated with said spindle for limiting the abnormal transverse and downward movements of said pivot point due to shocks imparted by said vehicle.

4. In a graphic speed recorder for a vehicle, the combination of an upright rotatively mounted spindle having an axial recess in the upper end thereof, an interior bar permanent magnet comprising a magnetic north pole at one end and a magnetic south pole at the other end, an exterior ring permanent magnet comprising a smooth interior surface and a pair of diametrically opposite and interiorly effective consequent magnetic north and south poles that are positioned opposite to and separated by air gaps from the magnetic south and north poles respectively of said bar magnet, means for fixedly securing said so positioned bar and ring magnets to said spindle, an annular induction member movably positioned in said air gaps and comprising a lower pivot point and a pinion adapted to mesh with the gear sector teeth of a recording arm, a resiliently supported pivot bearing in the axial recess of said spindle, and normally disengaged emergency means associated with said spindle for limiting the abnormal transverse and downward movements of said pivot point due to shocks imparted by said vehicle MABEL JAMES,
Executrix of the Estate of William James, Deceased.